(12) United States Patent
Coons

(10) Patent No.: US 8,831,295 B2
(45) Date of Patent: Sep. 9, 2014

(54) ELECTRONIC DEVICE CONFIGURED TO APPLY FACIAL RECOGNITION BASED UPON REFLECTED INFRARED ILLUMINATION AND RELATED METHODS

(75) Inventor: David D. Coons, Satellite Beach, FL (US)

(73) Assignee: Authentec, Inc., Melbourne, FL (US)

( * ) Notice: Subject to any disclaimer, the term of this patent is extended or adjusted under 35 U.S.C. 154(b) by 54 days.

(21) Appl. No.: 13/426,007

(22) Filed: Mar. 21, 2012

(65) Prior Publication Data

US 2013/0251215 A1  Sep. 26, 2013

(51) Int. Cl.
*G06K 9/00* (2006.01)

(52) U.S. Cl.
USPC .......................................................... 382/118

(58) Field of Classification Search
USPC .......................................................... 382/118
See application file for complete search history.

(56) References Cited

U.S. PATENT DOCUMENTS

| | | | |
|---|---|---|---|
| 7,680,299 B2 * | 3/2010 | Hosoi .............................. | 382/103 |
| 7,957,762 B2 | 6/2011 | Herz et al. | |
| 8,030,914 B2 | 10/2011 | Alameh et al. | |
| 8,396,265 B1 * | 3/2013 | Ross et al. .................... | 382/118 |
| 2003/0123710 A1 * | 7/2003 | Nakazawa et al. ............. | 382/115 |
| 2008/0167834 A1 | 7/2008 | Herz et al. | |
| 2009/0124376 A1 | 5/2009 | Kelly et al. | |
| 2010/0151916 A1 * | 6/2010 | Baek et al. .................... | 455/567 |
| 2011/0082711 A1 * | 4/2011 | Poeze et al. .................. | 705/3 |
| 2012/0235790 A1 * | 9/2012 | Zhao et al. .................... | 340/5.83 |

FOREIGN PATENT DOCUMENTS

CN  201910061 U  *  7/2011

OTHER PUBLICATIONS (Face Recognition Device F710, BioEnable, 2009, http://www.slideshare.net/alenjsc/face-recognition-device-f710).*
Intersil, Low Power Ambient Light and Proximity Sensor with Intelligent Interrupt and Sleep Modes, Nov. 23, 2010, pp. 1-16.
Ifixit, Little Sister Siri, Nov. 9, 2011, pp. 1-3.
Singh et al., Infrared and Visible Image Fusion for Face Recognition, Apr. 12, 2004, pp. 1-12.
Ghiass et al., Infrared Face Recognition: A Review of the State of the Art, Jul. 27, 2010, pp. 1-8.
Chen et al., IR and Visible Light Face Recognition, Apr. 5, 2005, pp. 1-37.

* cited by examiner

*Primary Examiner* — Samir Ahmed
*Assistant Examiner* — Totam Le
(74) *Attorney, Agent, or Firm* — Allen, Dyer, Doppelt, Milbrath & Gilchrist, P.A. Attorneys at Law

(57) ABSTRACT

An electronic device may include a housing and at least one infrared (IR) proximity sensor carried by the housing. The at least one IR proximity sensor may include an IR emitter configured to emit IR illumination toward a user, and an IR sensor configured to sense reflected IR illumination from the user. The electronic device may also include a camera carried by the housing and configured to capture an image of the user's face based upon the reflected IR illumination. The electronic device may further include a controller configured to apply facial recognition to the captured image of the user's face based upon the reflected IR illumination.

20 Claims, 5 Drawing Sheets

ELECTRONIC DEVICE CONFIGURED TO APPLY FACIAL RECOGNITION BASED UPON REFLECTED INFRARED ILLUMINATION AND RELATED METHODS

FIELD OF THE INVENTION

The present disclosure is related to electronic devices, and, more specifically, to electronic devices for facial recognition.

BACKGROUND OF THE INVENTION

Biometric forms of security have become increasingly popular. For example, a biometric form of security may provide convenient access to an electronic device without a password, for example, and, more particularly, without having to type the password, which is often time consuming. Some biometric security techniques include using a fingerprint, an iris of a user's eye, and facial recognition techniques for identification and authentication.

Of the biometric forms of security, facial recognition has become relatively mainstream in recent years, as an increased amount of applications for photo tagging and security has become available to consumers. Improvements in algorithm accuracy, computing capacity, and the growing availability of front-facing cameras on desktop computers, laptop computers, tablet computers, and mobile phones contribute to relatively rapid advancements in capability and availability of these approaches.

Interest in facial recognition may also be attributed to the fact that humans may readily associate with the concept of facial recognition. For example, a person may use the concept of facial recognition several hundred if not several thousand times each day. The facial recognition process is generally a subconscious one, but it is one that may be highly valued in social and business interactions, for example.

Computer automation of facial recognition started in the 1960's. These early approaches generally required a manual step to register key points on the user's face. These points would include the corners of the mouth, eyes, or nose, for example. Images were captured in controlled lighting conditions and poses would be front-facing. In a very basic sense, the relative position of these various facial features along with head shape may be used to create a mathematical template which is then stored and used for matching.

A typical application for facial recognition is automated identification of mug shot images. Mug shots collected in police departments, for example, are generally available in a database which might be searched automatically to help identify repeat offenders, for example.

Over the past 10 years, however, facial recognition approaches have become more automated to the point that multiple faces may be identified in relatively large crowds. In addition to improvements in functionality, these systems are also becoming more accurate. For example, performance of facial recognition, measured by false accept rates (FAR) has greatly improved, for example, by a factor of two every two years. Despite this ongoing improvement, false acceptance rates for facial recognition remains at 1:1000 versus using a fingerprint, which readily achieves 1:100,000 and can be shown to achieve better than 1:1,000,000 in certain implementations.

There are several approaches for facial recognition. One such approach is two dimensional (2D) facial recognition. In 2D face recognition, a facial recognition system operates on a simple 2D image. These systems tend to be very strongly affected by variations in lighting conditions and pose. A popular method used for 2D facial recognition is principle component analysis (PCA). A benefit of the PCA method is that the resulting templates are quite small. A typical template may only require about 1-2 kilobytes of storage, but some systems may require as much as 75 kilobytes.

Moreover, variations in lighting conditions and face orientation may have significant impact on these systems. For example, glare from glasses or eyes obscured by sunglasses may also degrade performance substantially. These factors may be annoying for indoor use, but may be an extreme problem for an electronic device, for example, a mobile wireless electronic device, which may be subject to these conditions and more, for example, sunlight.

Face position variations may also be an issue when the electronic device is mounted in a dock when used for in-car navigation, for example. Face position may also be an issue in pedestrian situations wherein holding the device up in front of the face may be both awkward and a safety concern.

To address some of these shortcomings, some systems use an infrared light source which enables operation in darkness without obtrusive visible lighting. A combination of both visible light and infrared has been shown to result in improved overall performance.

In 3D face recognition, a model of the facial structure may be produced which may be relatively accurate. From this model, a mathematical template may be created, which is then used for matching.

For 3D imaging, either stereo cameras are used or a geometric pattern is projected onto the user's face. A conventional camera can capture an image of a user's face with this pattern present, and the distortions in the pattern may be used to create the 3D model. The pattern might be produced by a laser. If the pattern is created with an infrared source, it would not be visible to the human eye. One challenge is that the imaging approaches may be relatively large with respect to size in an electronic device (using optics), and a somewhat controlled position (distance) from the user's face may be highly desired.

U.S. Pat. No. 7,957,762 to Herz et al. discloses using an ambient light sensor to augment a proximity sensor output. More particularly, Herz et al. discloses an IR emitter and an IR detector coupled to a microcontroller. The microcontroller may control switching between a proximity sensing mode and ambient light sensing mode by either closing and opening an optional shutter or by turning on and off the power to the IR emitter.

U.S. Patent Application Publication No. 2009/0124376 to Kelly et al. discloses a networked gaming system including anonymous biometric identification. More particularly, Kelly et al. discloses illuminating IR light emitting diodes (LEDs) to illuminate a patron's face upon determining a patron has moved within a perimeter of the system. A sonic signal, a pressure sensor, and a laser may be used to determine whether the patron is within the perimeter. A camera captures an image and transmits the image to a control board for further processing, for example, for facial recognition.

Despite the advances of facial recognition, further improvements are needed. For example, it may be desirable to provide increased accuracy facial recognition, for example, in a mobile wireless communications device, which has a relatively small area for components.

SUMMARY OF THE INVENTION

In view of the foregoing background, it is therefore an object of the present invention to more efficiently perform facial recognition, and with a reduced number of components, for example.

This and other objects, features, and advantages in accordance with the present invention are provided by an electronic device may include a housing and at least one infrared (IR) proximity sensor carried by the housing. The at least one IR proximity sensor may include an IR emitter configured to emit IR illumination toward a user, and an IR sensor configured to sense reflected IR illumination from the user. The electronic device may also include a camera carried by the housing and configured to capture an image of the user's face based upon the reflected IR illumination, for example. The electronic device may further include a controller configured to apply facial recognition to the captured image of the user's face based upon the reflected IR illumination. Accordingly, the electronic device may apply more efficient facial recognition in an electronic device with a reduced number of components, for example, for authenticating the user, using the IR proximity sensor for both proximity sensing and facial recognition.

The controller may be configured to determine user proximity based upon the IR sensor, for example. The controller may also be configured to perform at least one authentication function based upon the applied facial recognition.

The controller may be configured operate the IR emitter to selectively illuminate the user's face with an IR pattern. The IR pattern may include a grid, for example. The controller may be configured to apply three-dimensional (3D) facial recognition, for example.

The electronic device may further include a finger sensor carried by the housing and coupled to the controller. The at least one IR proximity sensor may be adjacent the finger sensor.

The housing may have front and back sides. The electronic device may further include a display coupled to the controller and carried by the front side, for example. The controller may selectively operate the display based upon the at least one IR proximity sensor. The at least one IR proximity sensor and the camera may be carried by the front side of the housing. The electronic device may further include a wireless transceiver carried by the housing and coupled to the controller, for example.

A method aspect is directed to a method of applying facial recognition using an electronic device that may include a housing, at least one infrared (IR) proximity sensor carried by the housing including an IR emitter configured to emit IR illumination toward a user, and an IR sensor configured to sense reflected IR illumination from the user. The electronic device may further include a camera carried by the housing. The method may include using the camera to capture an image of the user's face based upon the reflected IR illumination. The method may also include applying facial recognition to the captured image of the user's face, for example.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
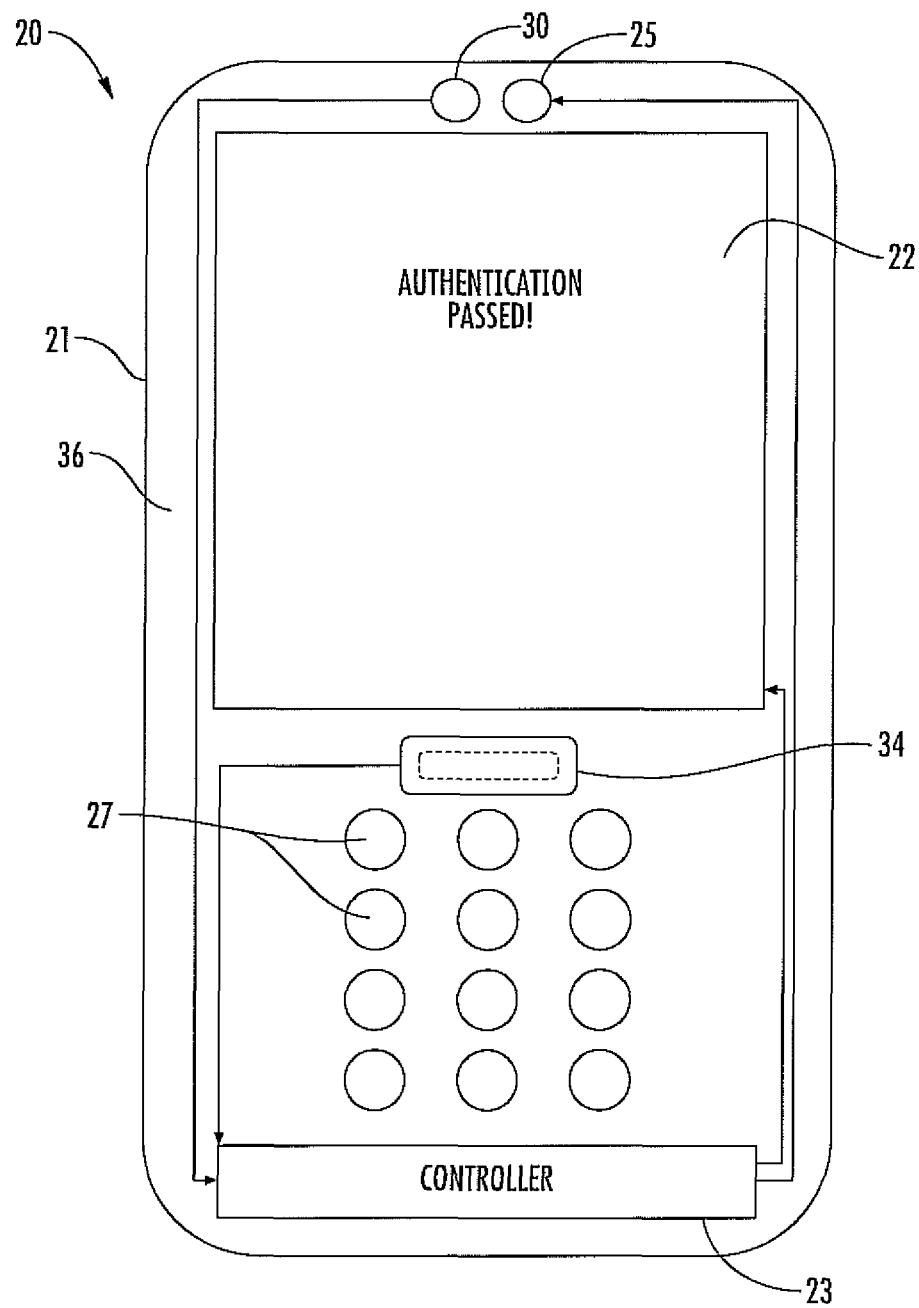
FIG. 1 is a plan view of an electronic device according to the present invention.
Figure 2:
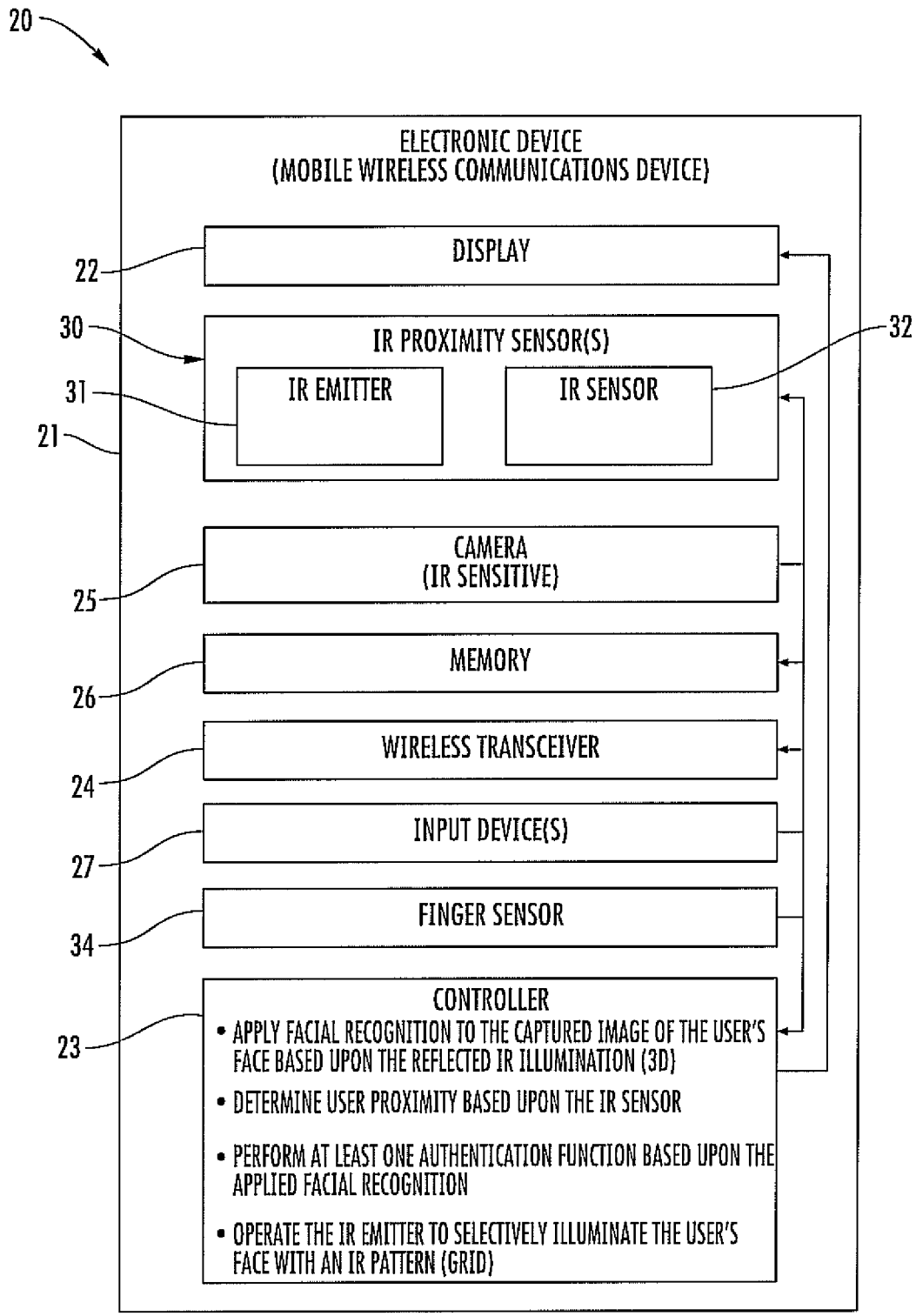
FIG. 2 is a schematic block diagram of the electronic device of FIG. 1.
Figure 3:
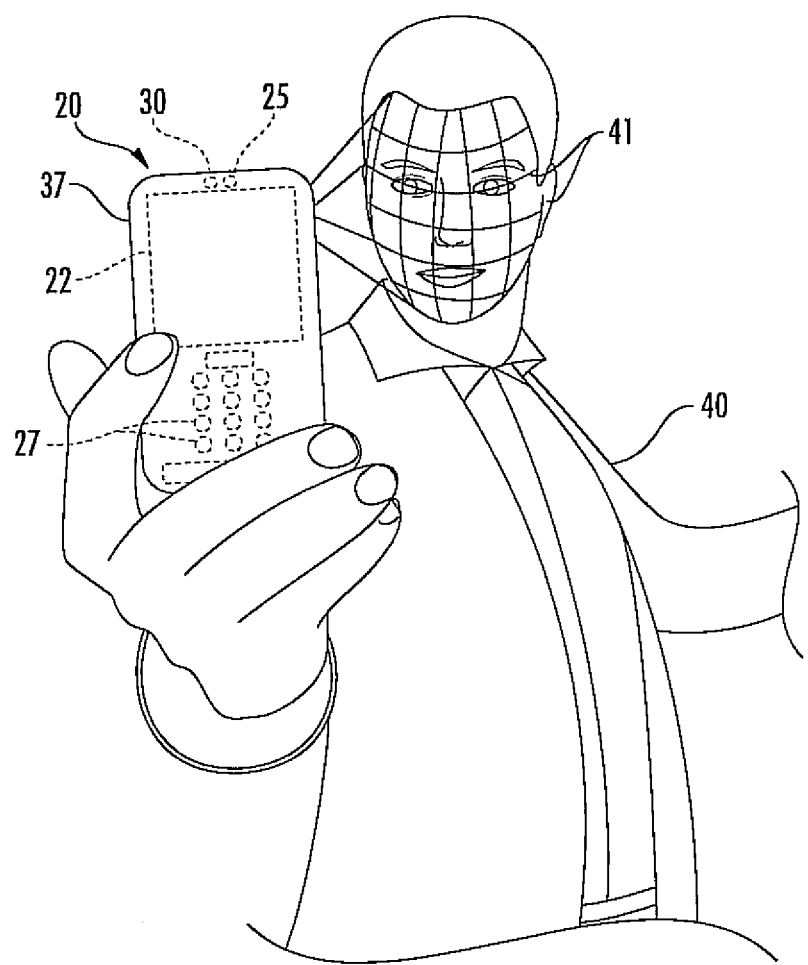
FIG. 3 is a perspective view of a user using the electronic device of FIG. 1 to apply facial recognition.

Referring initially to FIGS. 1-3, an electronic 20 device, which is advantageously in the form of a mobile wireless communications device, which may be a cellular telephone, for example, illustratively includes a housing 21. The housing 21 includes front and back sides 36, 37. The front side 36 faces the user 40, and more particularly, the user's face, during operation, for example.

The electronic device 20 also includes a display 22 carried by the front side 36 of the housing 21. The display 22 may be a liquid crystal display (LCD), for example, or may be another type of display, as will be appreciated by those skilled in the art. One or more input devices 27 may also be carried by the housing 21, for example, pushbuttons or keys. Other input devices may be included, for example, a touch screen.

The electronic device 20 also includes a controller 23 carried within the housing 21, and may be in the form of a processor, for example. The controller 23 is coupled to the display 22 and the input devices 27. A wireless transceiver 24 is also carried within the housing 21 and coupled to the controller 23. The wireless transceiver 24 cooperates with the controller 23 to perform at least one wireless communications function, for example, voice and/or data. In some embodiments, the electronic device 20 may not include a wireless transceiver 24.

The electronic device 20 also includes a finger sensor 34 carried by the front side 36 of the housing 21. The finger sensor 34 is coupled to the controller 23 and may cooperate therewith to perform an authentication function and/or a navigation function, as will be appreciated by those skilled in the art.

The electronic device 20 also includes an infrared (IR) proximity sensor 30 carried by the front side 36 of the housing 21 and coupled to the controller 23. Of course, the proximity sensor 30 may be carried by the rear 37 or other portion of the housing 21 in other embodiments. The IR proximity sensor 30 includes an IR emitter 31 configured to emit IR illumination toward a user 40, and an IR sensor 32 configured to sense reflected IR illumination from the user. The controller 23 is configured to determine user proximity based upon the IR sensor 32.

Additionally, the controller 23 may be configured to selectively activate the display 22 based upon the user's proximity. More particularly, the controller 23 may deactivate or turn off the display 22 when the electronic device is adjacent the side of the user's face, and activate or turn on the display when the electronic device is distant from the side of the user's face. This may be particularly advantageous for power savings, for example.

A camera 25 is also carried by the front side 36 of the housing 21 and is adjacent the IR proximity sensor 30. In some embodiments, the IR proximity sensor 30 and the camera 25 can be separated, so long as the IR emitter 31 and camera are facing toward the user's face. The camera 25 is configured to capture an image of the user's face based upon the reflected IR illumination. As will be appreciated by those skilled in the art, a camera of an electric device typically includes an IR filter to filter out or reduce IR illumination to increase image quality. The camera 25 of the present embodiments advantageously does not include an IR filter, and thus reflected IR illumination is allowed to be captured with an image.

The controller 23 is configured to apply facial recognition to the captured image of the user's face based upon the reflected IR illumination. The controller 23 may perform at least one authentication function based upon the applied facial recognition, for example, to unlock the electronic device 20 or particular functions of the electronic device. Thus, increased security may be provided with less user interaction. The controller 23 may apply facial recognition by comparing the captured image of the user's face to a stored image of the user's face in a database or memory 26 coupled to the controller. The authentication may be based upon the result of the comparison with the stored facial image in the memory 26. Advantageously, the IR proximity sensor 30, which is used for user proximity sensing, is also used for facial recognition.

As will be appreciated by those skilled in the art, two dimensional (2D) facial recognition systems may be greatly impacted by changes in lighting conditions, and especially in relatively low light conditions when a flash or other auxiliary illumination method is not desired. Existing implementations tend to make use of the display brightness to illuminate the user's face with some approaches intentionally switching the screen to an all-white display to maximize brightness.

The proximity sensor 30, which, as noted above, is typically used to determine user proximity based upon the IR sensor 32, is advantageously leveraged to address the above-noted problems. For example, for 2D imaging, and three dimensional (3D), as will be described in further detail below, low-light performance may be enhanced by imaging in the infrared (IR) range using the IR emitter 31 of the proximity sensor 30. Moreover, as will be appreciated by those skilled in the art, it may be desirable to use a more powerful IR emitter 31 than is typically used for determining user proximity. The power of the proximity sensor 30 may be based upon the type of proximity sensor.

Additionally, the present embodiments may be particularly advantageous for use in 3D systems. As will be appreciated by those skilled in the art, a 3D system is more accurate than a 2D system, but implementation of a 3D system presents greater challenges for implementation with respect to a 2D system. One prior art approach for applying 3D facial recognition is to use stereo imaging techniques, for example by using two cameras. However, it is relatively costly to implement stereo imaging on a portable device, such as a cellular telephone, for example, with relatively limited area for components such as cameras.

Another approach may be to map a geometric pattern of lines or a grid onto the user's face and then use the distortions in the observed pattern to infer 3D contours. However, a user would most likely not accept an approach that illuminates a geometric pattern on their face to capture 3D data from a single camera.

Advantageously, the electronic device 30 uses IR illumination, which is invisible to the human eye, to generate the pattern or grid (FIG. 3). More particularly, the controller 23 is configured to operate the IR emitter 31 of the IR proximity sensor 30 to selectively illuminate the user's face with an IR grid 41 (FIG. 3). Thus, the IR capable camera 25 captures the reflected IR image to infer the 3D contours, the controller 23 applies 3D facial recognition. As noted above the proximity sensor 30 also cooperates with the controller 23 to determine user proximity.

When the controller 23 is configured to apply 3D facial recognition, a selectable lens or other focusing device may be desired to focus the IR illumination to a focused beam of IR illumination, for example, to create the pattern or grid 41 on the user's face.

For example, controller 23 may cooperate with the IR emitter 31 so that the focused beam is scanned similar to the scanning in a cathode ray tube (CRT) display. Under relatively low light conditions, a relatively slow shutter time on the camera 25 may be desired, so there may be adequate time to scan the entire face while the shutter is open on the camera. A narrow beam of IR illumination may be sufficient for the camera 25 to capture an image of the entire user's face. For applying 3D facial recognition, the user's face may be scanned with IR illumination using larger line spacing. As will be appreciated by those skilled in the art, for 3D facial recognition to operate with increased accuracy under normal or bright light conditions, a light source should be relatively powerful, or sunlight, for example, on the user's face may completely mask the emitted IR pattern.

Figure 4:
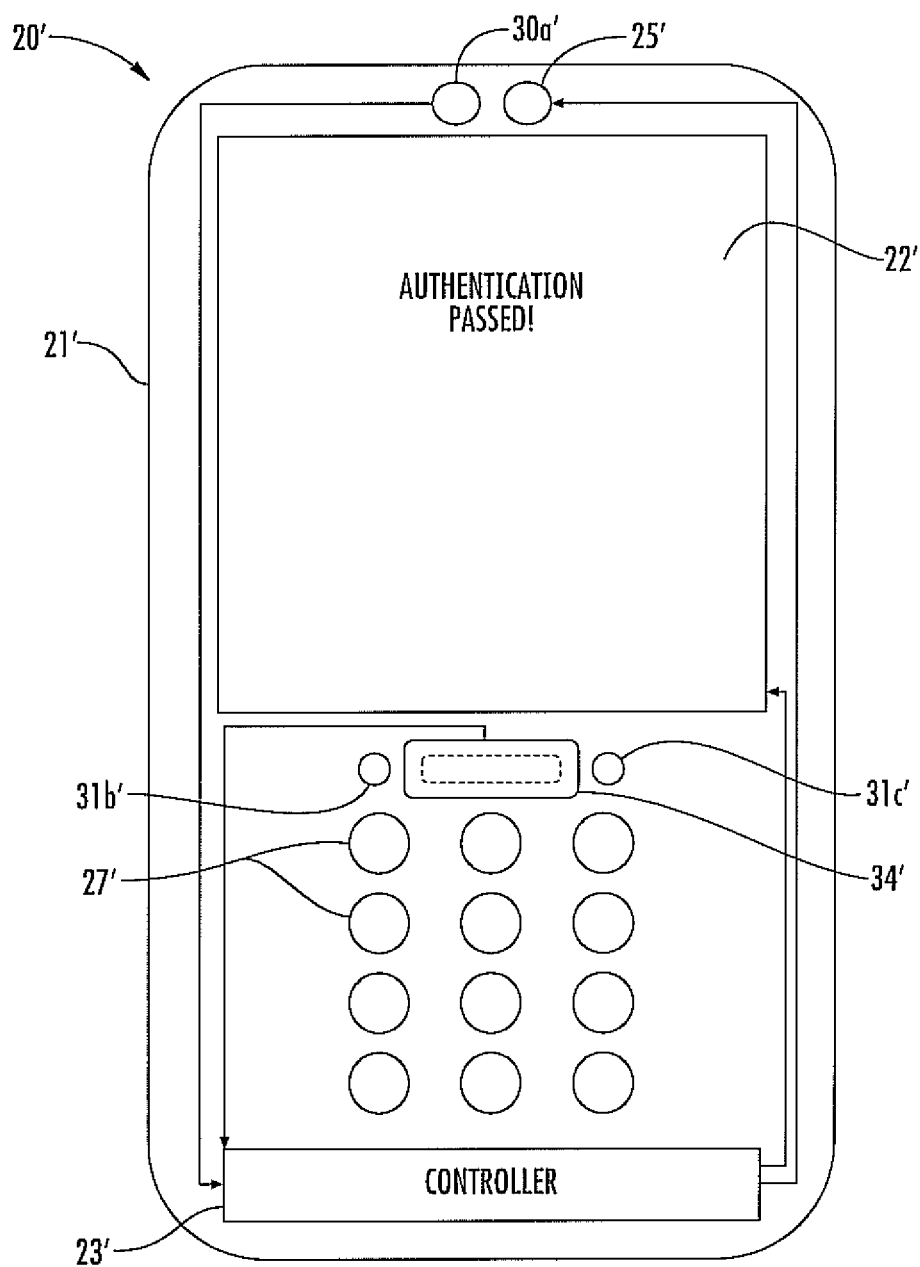
FIG. 4 is plan view of an electronic device according to another embodiment of the present invention.

Referring now to FIG. 4, according to another embodiment, the electronic 20' includes an IR proximity sensor 30' and several spaced apart IR emitters 31b'-31c' carried by the housing 21'. As will be appreciated by those skilled in the art, additional IR emitters 31b'-31c' may be advantageous for increasing the amount of the IR illumination, for example, to address bright light conditions. The IR emitters 31b', 310' are adjacent the finger sensor 34'. For example, in embodiments where the electronic device 20' is a laptop or tablet computer, the IR emitters 31b', 31c' may be used in conjunction with visible light emitting diodes (LED) light guides, which allow a user to more easily identify the finger sensor 34'. It should be noted that the multiple IR emitters may be included within a single proximity sensor, or be included within multiple respective proximity sensors, for example. Additionally, as will be appreciated by those skilled in the art, the use of multiple IR emitters with a single IR sensor may enable gesture recognition. In this case, the IR emitters may be pulsed in rapid succession. Reflected light may vary in intensity depending on the position of the user's hand. Thus, the location of the user's hand may be inferred based on relative reflection from the spaced IR emitters. In such a case, all of the IR emitters may be turned on for a brief moment while a photo is captured from the camera.

Figure 5:
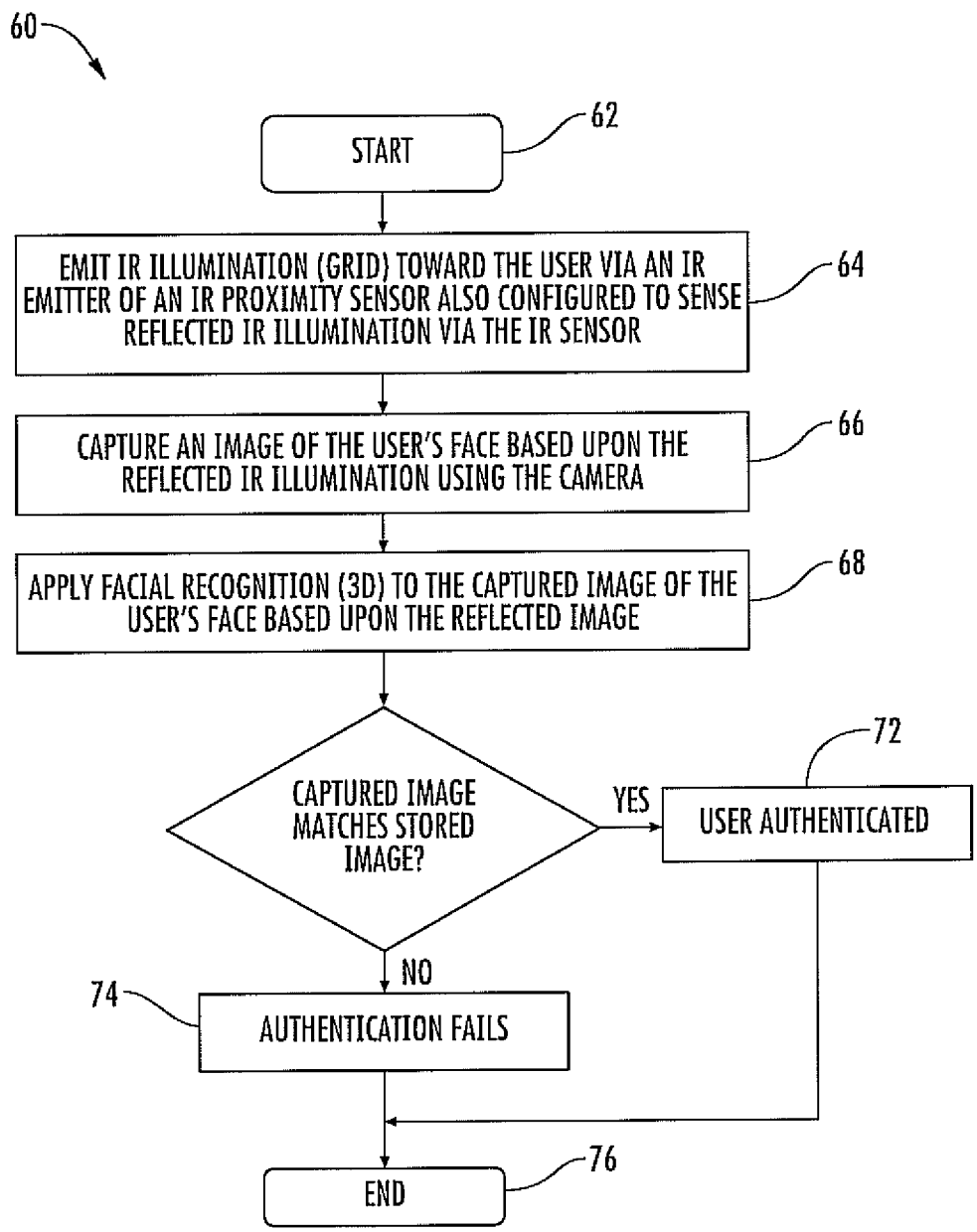
FIG. 5 is a flow chart of a method of applying facial recognition according to the present invention.

Referring now to the flowchart 60 in FIG. 5, a method aspect is directed to a method of applying facial recognition using an electronic device 20 that includes at least one infrared (IR) proximity sensor 30 including an IR emitter 31 configured to emit IR illumination toward a user 40, and an IR sensor 32 configured to sense reflected IR illumination from the user, and a camera 25 carried by the housing 21 and configured to capture an image of the user's face based upon the reflected IR illumination. Starting at Block 62, the method includes emitting IR illumination, and more particularly, an IR grid toward the user 40 via the IR emitter 31 (Block 64). The method further includes, at Block 66, capturing an image of the user's face based upon the reflected IR illumination using the camera 25. At Block 68, the method includes applying facial recognition to the captured image of the user's face based upon the reflected IR illumination, for example, by using the controller 23. At Block 70, the method includes comparing the captured image of the user's face to facial images stored in the memory 26. Based upon the comparison, the user may be authenticated (Block 72) and permitted to access the electronic device 20 or functions of the electronic device. Alternatively, if a match is not found in the memory 26, i.e., authentication fails, the user is denied access to the electronic device or function of it (Block 74). The method ends at Block 76.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
   a housing;
   a finger biometric sensor carried by said housing;
   a plurality of spaced apart first infrared (IR) emitters carried by the housing and configured to emit IR illumination toward a user;
   at least one IR proximity sensor carried by said housing and comprising at least one second IR emitter configured to emit IR illumination toward the user, and an IR sensor configured to sense reflected IR illumination from the user;
   a camera carried by said housing and configured to capture an image of the user's face based upon the reflected IR illumination from the plurality of first IR emitters and the at least one second IR emitter; and
   a controller configured to
      apply facial recognition to the captured image of the user's face based upon the reflected IR illumination, perform at least one authentication function based upon the applied facial recognition, successively enable each of the plurality of first IR emitters,
      apply gesture recognition based on the reflected IR illumination reflected by the user's hand when each of the plurality of first IR emitters is enabled, and
      perform at least one further authentication function based upon the finger biometric sensor.

2. The electronic device of claim 1, wherein said controller is configured to determine user proximity based upon said IR sensor.

3. The electronic device of claim 1, wherein said controller is configured operate said at least one second IR emitter to selectively illuminate the user's face with an IR pattern.

4. The electronic device of claim 3, wherein the IR pattern comprises a grid.

5. The electronic device of claim 1, wherein said controller is configured to apply three-dimensional (3D) facial recognition.

6. The electronic device of claim 1, wherein said at least one IR proximity sensor is adjacent said finger biometric sensor.

7. The electronic device of claim 1, wherein said housing has front and back sides; and further comprising a display coupled to said controller and carried by the front side; and wherein said controller selectively operates said display based upon said at least one IR proximity sensor.

8. The electronic device of claim 7, wherein said at least one IR proximity sensor and said camera are carried by the front side of said housing.

9. A mobile wireless communications device comprising:
   a housing;
   a finger biometric sensor carried by said housing;
   a plurality of spaced apart first infrared (IR) emitters carried by the housing and configured to emit IR illumination toward a user;
   at least one IR proximity sensor carried by said housing and comprising at least one second IR emitter configured to emit IR illumination toward the user, and an IR sensor configured to sense reflected IR illumination from the user;
   a camera carried by said housing and configured to capture an image of the user's face based upon the reflected IR illumination from the plurality of first IR emitters and the at least one second IR emitter;
   a controller configured to
      apply facial recognition to the captured image of the user's face based upon the reflected IR illumination, perform at least one authentication function based upon the applied facial recognition,
      successively enable each of the plurality of first IR emitters,
      apply gesture recognition based on the reflected IR illumination reflected by the user's hand when each of the plurality of first IR emitters is enabled, and
      perform at least one further authentication function based upon the finger biometric sensor; and
   a wireless transceiver carried by said housing and coupled to said controller.

10. The mobile wireless communications device of claim 9, wherein said controller is configured to determine user proximity based upon said IR sensor.

11. The mobile wireless communications device of claim 9, wherein said controller is configured operate said at least one second IR emitter to selectively illuminate the user's face with an IR pattern.

12. The mobile wireless communications device of claim 11, wherein the IR pattern comprises a grid.

13. The mobile wireless communications device of claim 9, wherein said controller is configured to apply three-dimensional (3D) facial recognition.

14. The mobile wireless communications device of claim 9, wherein said housing has front and back sides; and further comprising a display coupled to said controller and carried by the front side; and wherein said controller selectively operates said display based upon said at least one IR proximity sensor.

15. The mobile wireless communications device of claim 14, wherein said at least one IR proximity sensor and said camera are carried by the front side of said housing.

16. A method of applying facial recognition using an electronic device comprising a housing, a finger biometric sensor carried by the housing, a plurality of spaced apart first infrared (IR) emitters carried by the housing and configured to emit IR illumination toward a user, at least one IR proximity sensor carried by the housing and comprising at least one second IR emitter configured to emit IR illumination toward the user and an IR sensor configured to sense reflected IR illumination from the user, and a camera carried by the housing, the method comprising:
   using the camera to capture an image of the user's face based upon the reflected IR illumination from the plurality of first IR emitters and the at least one second IR emitter;
   applying facial recognition to the captured image of the user's face;
   performing at least one authentication function based upon the applied facial recognition;
   successively enable each of the plurality of first IR emitters;
   apply gesture recognition based on the reflected IR illumination reflected by the user's hand when each of the plurality of first IR emitters is enabled, and
   performing at least one further authentication function based upon the finger biometric sensor.

17. The method of claim 16, further comprising determining user proximity based upon the IR sensor.

18. The method of claim 16, further comprising operating the at least one second IR emitter to selectively illuminate the user's face with an IR pattern.

19. The method of claim 18, wherein the IR pattern comprises a grid.

20. The method of claim 16, wherein applying facial recognition comprises applying three-dimensional (3D) facial recognition.

* * * * *

UNITED STATES PATENT AND TRADEMARK OFFICE
CERTIFICATE OF CORRECTION

PATENT NO. : 8,831,295 B2  Page 1 of 1
APPLICATION NO. : 13/426007
DATED : September 9, 2014
INVENTOR(S) : David Coons It is certified that error appears in the above-identified patent and that said Letters Patent is hereby corrected as shown below:

IN THE CLAIMS:

Column 7, Line 42       Delete: "configured operate"
                        Insert: -- configured to operate --

Column 8, Line 27       Delete: "configured operate"
                        Insert: -- configured to operate --

Signed and Sealed this
Second Day of December, 2014

Michelle K. Lee
*Deputy Director of the United States Patent and Trademark Office*